United States Patent
Overman (10) Patent No.: US 11,815,025 B2
(45) Date of Patent: Nov. 14, 2023

(54) FUEL NOZZLE

(71) Applicant: General Electric Company, Schenectady, NY (US)

(72) Inventor: Nicholas R. Overman, Sharonville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/315,028

(22) Filed: May 7, 2021

(65) Prior Publication Data
US 2022/0356846 A1 Nov. 10, 2022

(51) Int. Cl.
*F23R 3/34* (2006.01)
*F02C 7/232* (2006.01)
*F23R 3/28* (2006.01)

(52) U.S. Cl.
CPC ............... *F02C 7/232* (2013.01); *F23R 3/28* (2013.01); *F23R 3/34* (2013.01)

(58) Field of Classification Search
CPC .............. F02C 7/232; F23R 3/28; F23R 3/34
See application file for complete search history.

(56) References Cited

U.S. PATENT DOCUMENTS

| | | | |
|---|---|---|---|
| 3,154,095 A | 10/1964 | Cleminshaw et al. | |
| 4,022,165 A | 5/1977 | Eckert et al. | |
| 6,422,199 B1 | 7/2002 | Buckley et al. | |
| 7,556,017 B2 | 7/2009 | Gibson | |
| 9,206,778 B2 | 12/2015 | Kim et al. | |
| 9,376,992 B2 | 6/2016 | Brown et al. | |
| 9,605,635 B2 | 3/2017 | Park et al. | |
| 10,197,027 B2 | 2/2019 | Kalenborn | |
| 10,612,503 B2 | 4/2020 | Kalenborn | |
| 2016/0265780 A1* | 9/2016 | Patel | F23R 3/283 |
| 2018/0163635 A1* | 6/2018 | Marocchini | F23N 1/005 |
| 2019/0093569 A1* | 3/2019 | Ryon | F23R 3/38 |
| 2020/0326073 A1* | 10/2020 | Kim | F02C 7/04 |

FOREIGN PATENT DOCUMENTS

| | | |
|---|---|---|
| CN | 103237979 B | 9/2015 |
| CN | 105464865 B | 11/2017 |
| WO | 2020041111 A1 | 2/2020 |

* cited by examiner

*Primary Examiner* — Arun Goyal
(74) *Attorney, Agent, or Firm* — Venable LLP; Elizabeth C. G. Gitlin; Michele V. Frank (57) ABSTRACT

A fuel nozzle for a combustor may include a primary fuel passage having a primary fuel outlet. A secondary fuel passage having a secondary fuel outlet. A valve located within the secondary fuel passage. The valve may include a stationary hub having a plurality of first angled surfaces. The valve may include a movable sleeve having a plurality of second angled surfaces. Each of the plurality of first angled surfaces aligns axially with a respective one of the plurality of second angled surfaces to define a slot therebetween. The valve is movable between a plurality of positions to open, to close, or to partially open the slots.

20 Claims, 4 Drawing Sheets

FUEL NOZZLE

TECHNICAL FIELD

The present disclosure relates to a fuel nozzle. More particularly, the present disclosure relates to a fuel nozzle having a variable passage in the tip.

BACKGROUND

Current fuel nozzles for combustors are typically concentric, dual orifice nozzles including large flow divider valves in an upper housing. Such nozzles have a primary fuel passage located concentrically within a secondary fuel passage. The flow divider valves are large and provide secondary fuel flows that have low spray penetration, low mixing, and low atomization.

BRIEF SUMMARY

According to an embodiment, a fuel nozzle for a combustor may include a primary fuel passage having a primary fuel outlet; a secondary fuel passage having a secondary fuel outlet; and a valve located within the secondary fuel passage. The valve may include a stationary hub having a plurality of first angled surfaces; and a movable sleeve having a plurality of second angled surfaces. Each of the plurality of first angled surfaces may align axially with a respective one of the plurality of second angled surfaces to define a slot therebetween. The valve may be movable among a plurality of positions to open, to close, or to partially open the slots.

According to an embodiment, a fuel nozzle for a combustor may include a primary fuel passage having a primary fuel outlet; a secondary fuel passage having a secondary fuel outlet; and a valve located within the secondary fuel passage, the valve being movable among a plurality of positions including: (i) a first position where a stationary first portion and a movable second portion abut; (ii) a second position where the stationary first portion is spaced a first distance from the movable second portion; and (iii) a third position where the stationary first portion is spaced a second distance from the movable second portion, wherein the second distance is greater than the first distance. The valve may be configured to operate in a plurality of positions to meter flow through the secondary fuel passage and through the secondary fuel outlet and into an interior of the combustor, based on the position of the stationary first portion and the movable second portion.

Additional features, advantages, and embodiments of the present disclosure are set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

According to embodiments of the present disclosure, by way of example, a fuel nozzle may be provided for an ultra-compact combustor or a combustor of a gas turbine engine. The fuel nozzle may include a primary fuel passage and a secondary fuel passage. The primary fuel passage and the secondary fuel passage may be parallel or non-parallel. The secondary passage may include a valve sleeve configured to adjust a flow area of a slot to control the flow through the secondary passage.

Figure 1A:
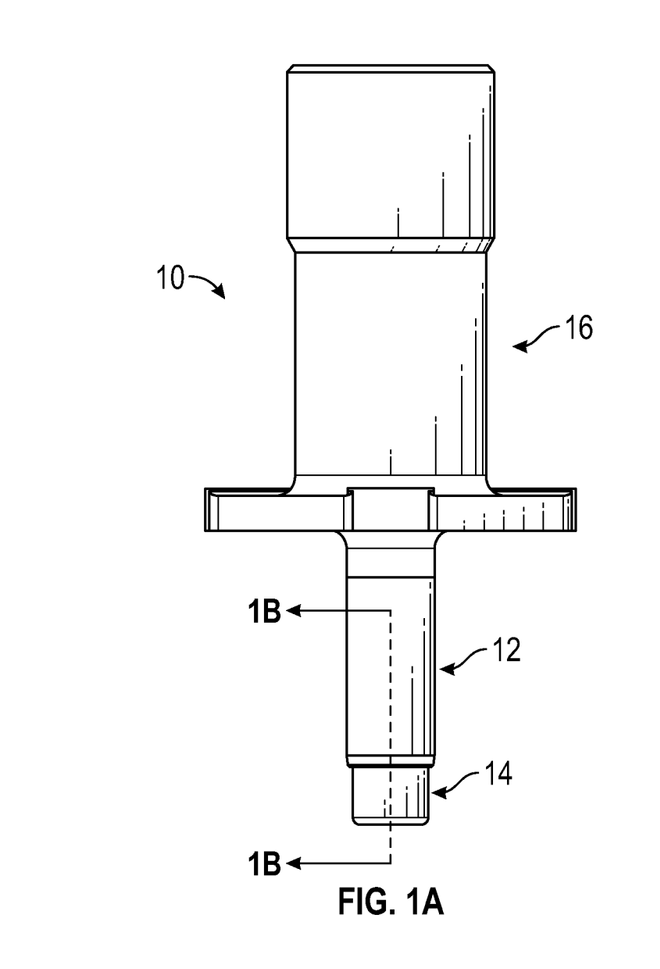
FIG. 1A shows a schematic view of a fuel nozzle, according to an embodiment of the present disclosure.
Figure 1B:
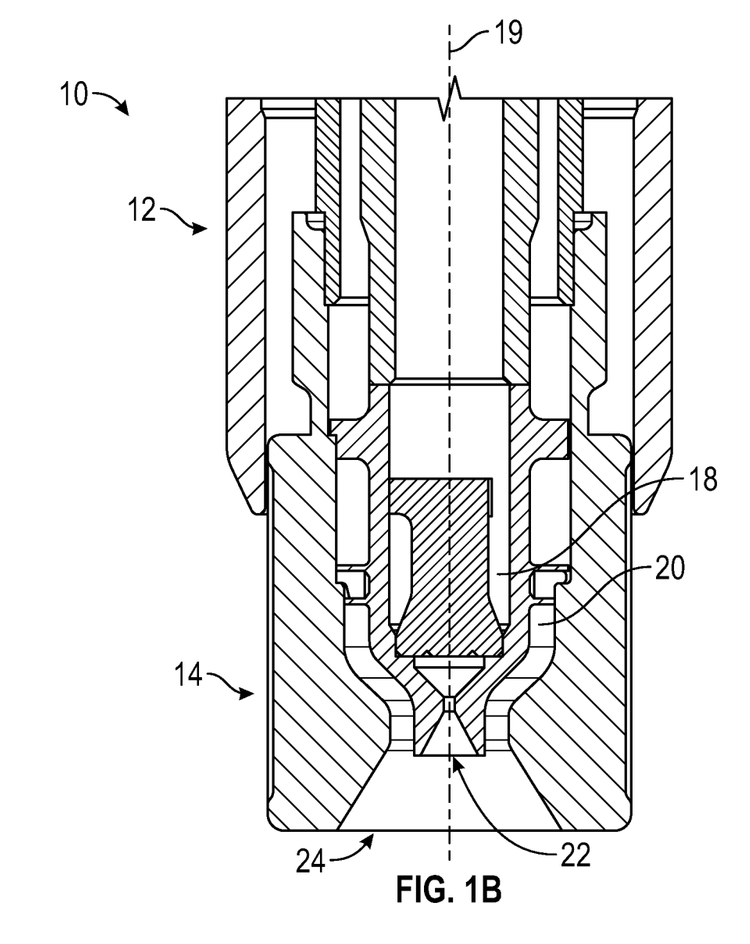
FIG. 1B shows a schematic, sectional view of the fuel nozzle of FIG. 1A, taken along the section line 1B-1B of FIG. 1A, according to an embodiment of the present disclosure.

Referring to FIGS. 1A and 1B, a schematic of a fuel nozzle 10 is shown. The fuel nozzle 10 may include a lower body 12, a tip 14, and an upper body 16. Referring to FIG. 1B, the fuel nozzle 10 may include a primary fuel passage 18 and a secondary fuel passage 20. The primary fuel passage 18 and the secondary fuel passage 20 may be separate passages. That is, the primary fuel passage 18 and the secondary fuel passage 20 may not be in fluid communication with one another. The primary fuel passage 18 may be located within (e.g., inside) the secondary fuel passage 20. The primary fuel passage 18 and the secondary fuel passage 20 may be concentrically aligned. The primary fuel passage 18 may be located concentrically within the secondary fuel passage 20. For example, the primary fuel passage 18 and the secondary fuel passage 20 may share a common axial centerline 19 such that they are coaxial. Thus, the fuel nozzle 10 may be a concentric, dual orifice fuel nozzle. The primary fuel passage 18 may include a primary fuel outlet 22 and the secondary fuel passage 20 may include a secondary fuel outlet 24. The primary fuel outlet 22 may be located within the secondary fuel passage 20 and behind, or upstream, of the secondary fuel outlet 24. Accordingly, the fuel nozzle 10 may be considered to include a fixed orifice and a fixed spin slot size. That is, the primary fuel outlet 22 and the secondary fuel outlet 24 are fixed.

Referring again to FIG. 1A, a flow divider valve may be provided in the upper body 16. The flow divider valve may control the secondary flow through the secondary fuel passage 20. There may be a large pressure drop across the flow divider valve. Furthermore, when the flow divider valve is in the initial stages of opening (e.g., beginning to allow flow through the secondary fuel passage 20), there may be low atomization at the outlets.

During operation, fuel flow may be introduced through the primary fuel passage 18 and the secondary fuel passage 20. The flow through the secondary fuel passage 20 may be controlled by the flow divider valve provided in the upper body 16. Injection by the primary fuel passage 18 and the secondary fuel passage 20 is into a similar zone (see, for example, FIGS. 6A and 6B). Flow through the secondary fuel outlet 24 of the secondary fuel passage 20 is not controllable (e.g., the secondary fuel outlet 24 cannot be opened, closed, partially opened, or partially closed). In some cases, there may be control of the flow through the secondary fuel passage 20 upstream of the secondary fuel outlet 24. The fuel nozzle 10 thus suffers from introducing too much or too little fuel into the primary and secondary combustion zones. This may result in high emissions and low efficiency.

Figure 2:
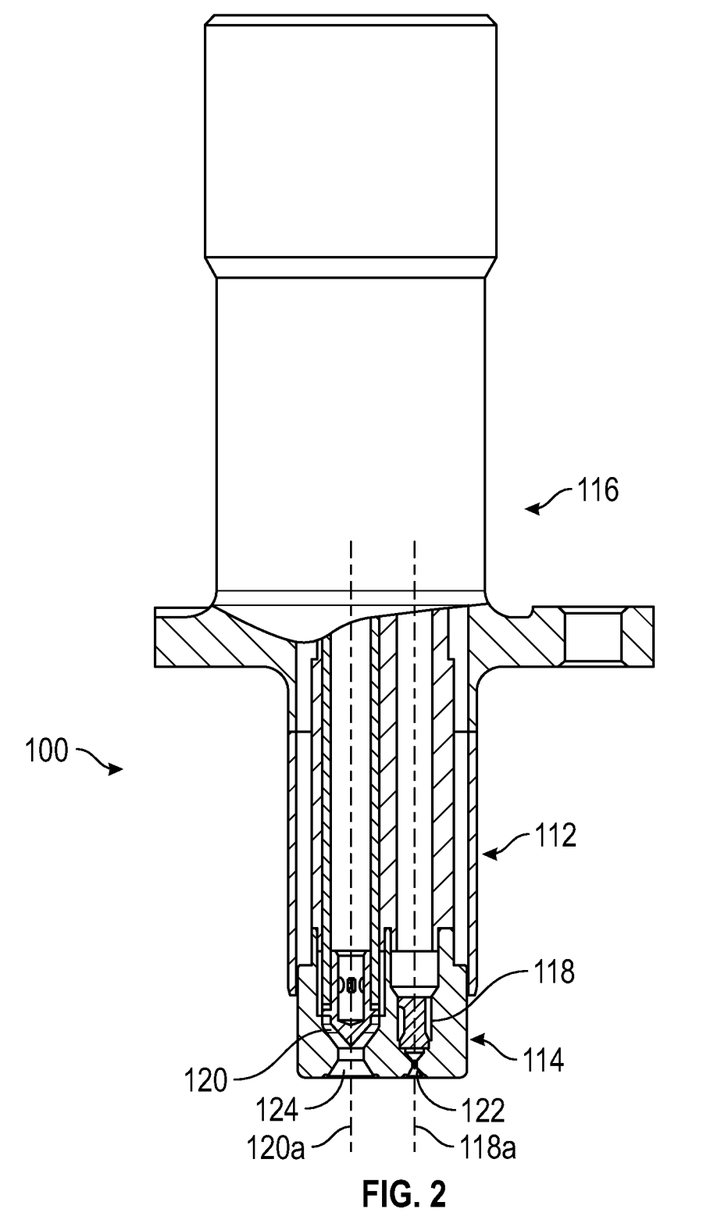
FIG. 2 shows a schematic, sectional view of a fuel nozzle, taken along a centerline of the fuel nozzle, according to an embodiment of the present disclosure.

Referring to FIG. 2, a schematic of a fuel nozzle 100 is shown. The fuel nozzle 100 may include a lower body 112, a tip 114, and an upper body 116. The fuel nozzle 100 may include a primary fuel passage 118 and a secondary fuel passage 120. The primary fuel passage 118 and the secondary fuel passage 120 may be separate passages. That is, the primary fuel passage 118 and the secondary fuel passage 120 may not be in fluid communication with one another.

As depicted, the primary fuel passage 118 and the secondary fuel passage 120 may be located next to one another (i.e., adjacent). That is, an axial centerline 118*a* of the primary fuel passage 118 and an axial centerline 120*a* of the secondary fuel passage 120 may be spaced from one another. The primary fuel passage 118 may include a primary fuel outlet 122 and the secondary fuel passage 120 may include a secondary fuel outlet 124. The primary fuel outlet 122 may be separate from and spaced from the secondary fuel outlet 124. The primary fuel outlet 122 and the secondary fuel outlet 124 may each provide the fuel flow in a spray that is a spray cone, a flat sheet, discrete jets, or any combination thereof. The primary fuel outlet 122 and the secondary fuel outlet 124 may provide the same spray or a different spray. The fuel nozzle 100 may be a dual simplex tip fuel nozzle.

FIGS. 3, 4A, 4B, 5A, and 5B show a schematic portion of the tip 114 of the fuel nozzle 100 having the secondary fuel passage 120 and the secondary fuel outlet 124. The secondary fuel passage 120 may include an assembly 126 configured to control flow through the secondary fuel passage 120 and the secondary fuel outlet 124. The assembly 126 may be a valve, such as, for example, a sleeve valve. The assembly 126 may be configured to meter or selectively permit a predetermined flow of fuel through the secondary fuel passage 120 and the secondary fuel outlet 124. The assembly 126 may be controllable between a closed position, a partially open position (also referred to as a partially closed position), and an open position. The position of the assembly 126 may be selected based on a desired flow rate through the secondary fuel passage 120.

The assembly 126 may include a first portion 128. The first portion 128 may be stationary or fixed within the secondary fuel passage 120. The first portion 128 may be a stem, a hub, or a block. The first portion 128 may include one or more openings 130 to permit flow from a first portion (not visible, upstream of the one or more openings 130) of the secondary fuel passage 120 to a second portion of the secondary fuel passage 120 between the body of the tip 114 and the first portion 128. Any number of openings 130 may be included. The first portion 128 may include one or more members 129. The members 129 may protrude from a body of the first portion 128. The members 129 may be spaced apart from one another such that a gap or a slot 131 is present between neighboring or adjacent members 129. The members 129 may each include an angled surface 132. The angled surface 132 may be located on a plurality of protruding members 129 on a side surface of the stationary hub (e.g., first portion 128).

The assembly 126 may include a second portion 134. The second portion 134 may be movable or controllable within the secondary fuel passage 120. The second portion 134 may be a sleeve or cylindrical body. The second portion 134 may include one or more projections 136, also referred to as teeth 136. The projections 136 may be fingers or extensions of a tubular body 138 of the second portion 134. The projections 136 may each include an angled surface 140. The angled surfaces 140 may be located at a distal end of the plurality of teeth or projections 136. The projections 136 may extend axially downward from a body of the movable sleeve.

The numbers of slots 131 may be equal to a number of the projections 136. In this manner, the projections 136 may be configured to move within the slots 131 between a number of positions as will be described herein. The angled surfaces 140 on the projections 136 may mate or conform to the angled surfaces 132 on the members 129. Thus, when the angled surfaces 140 and the angled surfaces 132 are in contact with one another the surfaces touch (e.g., in mating engagement) such that flow through the slot 131 is prevented and/or only a small leakage flow is permitted. Any number of slots 131, projections 136, and members 129 may be included. The angle of the angled surfaces 140 and the angled surfaces 132 may be any angle. In an embodiment, the angle of the angled surfaces 140 and the angled surfaces 132 may be the same.

In operation, fuel may flow through an interior of the first portion 128 and exit the one or more openings 130. The fuel may then flow through one or more gaps or spaces 142 between adjacent or neighboring projections 136 and through the slots 131. The amount of flow through the slots 131 may be controlled using the fuel nozzle 100.

Figure 3:
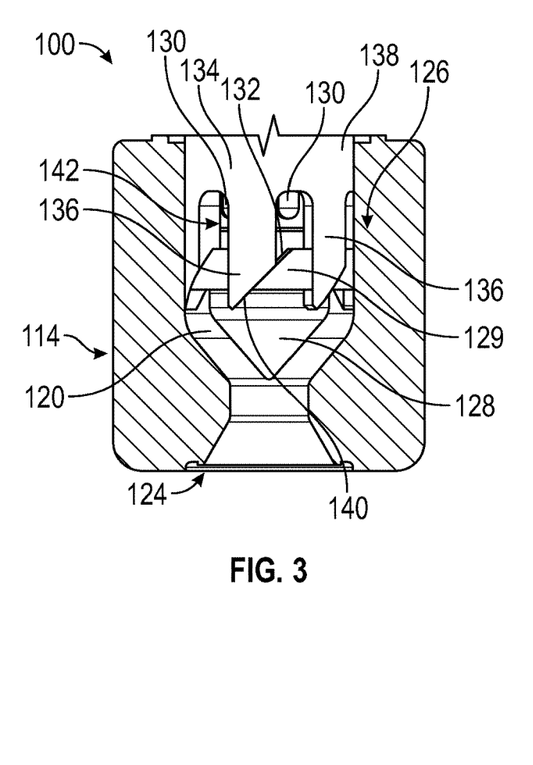
FIG. 3 shows a schematic, partial sectional view of a fuel nozzle, taken along a centerline of the fuel nozzle, a fuel passage of the fuel nozzle being in a closed position, according to an embodiment of the present disclosure.

For example, in FIG. 3, the second portion 134 of the assembly 126 may be controlled or moved such that the angled surfaces 140 abut or touch the angled surfaces 132. Thus, in FIG. 3, the secondary fuel passage 120 is in a closed position and no flow is permitted through the secondary fuel outlet 124.

Figure 4A:
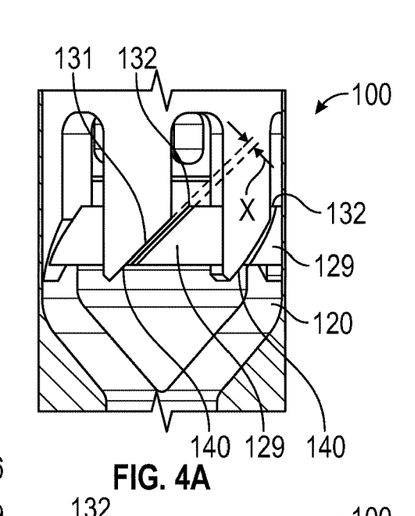
FIG. 4A shows a schematic, partial sectional view of the fuel nozzle of FIG. 3, taken along a centerline of the fuel nozzle, a fuel passage of the fuel nozzle being in a partial open position, according to an embodiment of the present disclosure.
Figure 4B:
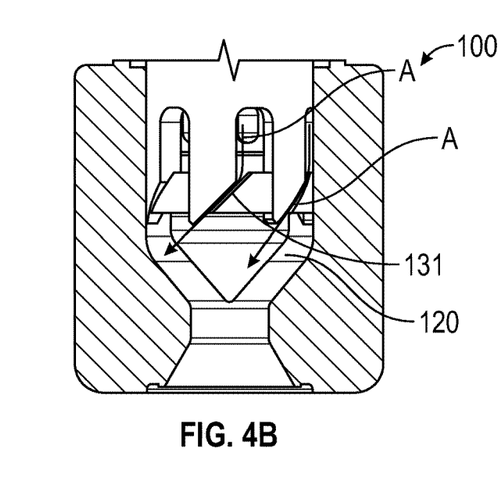
FIG. 4B shows a schematic, partial sectional view of the fuel nozzle of FIG. 4A, taken along a centerline of the fuel nozzle, showing a flow through the fuel passage, according to an embodiment of the present disclosure.
Figure 5A:
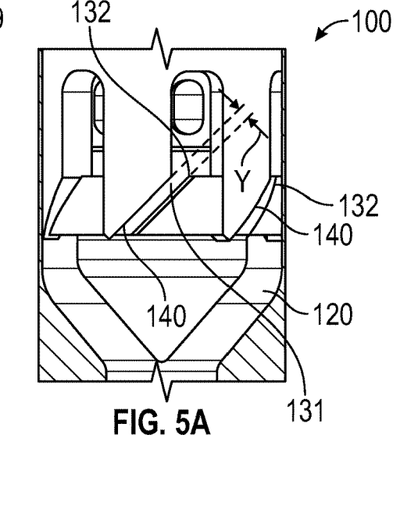
FIG. 5A shows a schematic, partial sectional view of the fuel nozzle of FIG. 3, taken along a centerline of the fuel nozzle, a fuel passage of the fuel nozzle being in a wholly open position, according to an embodiment of the present disclosure.
Figure 5B:
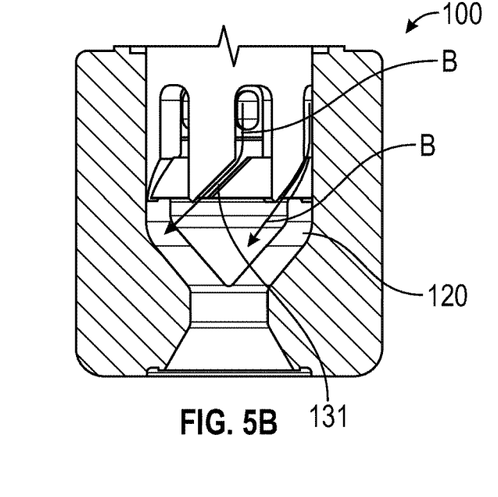
FIG. 5B shows a schematic, partial sectional view of the fuel nozzle of FIG. 5A, taken along a centerline of the fuel nozzle, showing a flow through the fuel passage, according to an embodiment of the present disclosure.

In FIGS. 4A and 4B, the second portion 134 of the assembly 126 may be controlled or moved such that the angled surfaces 140 are spaced apart by a first distance X. The first distance X may be any distance between a fully closed position (FIG. 3) and a fully open position (FIGS. 5A and 5B). Although a single distance is shown, any number of positions between the fully closed and fully open positions may be permitted. In the position of FIGS. 4A and 4B, a fuel flow A is permitted to flow through the slots 131.

In FIGS. 5A and 5B, the second portion 134 of the assembly 126 may be controlled or moved such that the angled surfaces 140 are spaced apart by a second distance Y. The second distance Y may be greater than the first distance X. The second distance Y may be a maximum distance permitted between the angled surfaces 140 and the angled surfaces 132. In the position of FIGS. 5A and 5B, a fuel flow B is permitted to flow through the slots 131. The fuel flow B may be greater than the fuel flow A.

The distance that separates the angled surfaces 140 from the angled surfaces 132 may define a size of the slot 131. The size of the slot 131 may include a length, a width, and/or an area. Angled surfaces separated by a distance X may define a smaller size than angled surfaces separated by a distance Y. The greater the separation between the angled surfaces 140 and 132, the greater the size of the slot 131. When the angled surfaces 140 and 132 abut or touch, the slot 131 may be reduced to a size that is smaller than the size at distance X and may be a size that permits no flow or permits only a leakage flow. The slot 131 may be opened to varying degree. The degree to which the slot 131 is open may depend on the size of the engine, the flow rate required of the valve, spray angle, other parameters, or any combination thereof. The distance between the angled surfaces 140 and 132 may be in the range of 0.000 inches and 0.060 inches. The distance between the angled surfaces 140 and 132 may be in the range of 0.000 inches and 0.120 inches.

The percentage to which the assembly 126 is open may depend on the operating condition of the engine and/or on the particular engine. For example, the assembly 126 may be closed or partially closed at lower power conditions. For example, the assembly 126 may be open or partially open at high power conditions.

With continued reference to FIGS. 3, 4A, 4B, 5A, and 5B, it can be seen that the angled surfaces 140 and 132 may provide slots 131 that are angled. The angled slots 131 may impart a spin or swirl on the fuel flowing through the secondary fuel passage 120. The spin imparted on the flow through the slots 131 may assist in atomizing the fuel flow and may assist in promoting mixing with an air flow through the combustion section of the engine. Accordingly, the assembly 126 may provide a variable secondary spin slot (e.g., slot 131) size. The fuel nozzle 100 may be considered to have a variable secondary atomizing spin slot. The tip may also perform the function of a flow divider valve, that is, the tip may take more of a pressure drop. This may result in a benefit to atomization of the flow.

Control of the assembly 126 may be provided through any known device, such as, for example, a mechanical actuator, an electrical actuator, a hydraulic or pneumatic actuator, or any combination thereof. For example, a biasing member, such as a spring, may be provided that biases the assembly 126 into a predetermined position. In an example, the spring may bias the assembly 126 to the closed position. In another example, the spring may bias the assembly 126 to an open position. In still another example, when fuel pressure is applied to the tip, the pressure may act against the second portion 134 and the force of the biasing member, thus, moving the second portion 134 away from the first portion 128, acting to open the slots 131 (either partially or wholly). As fuel pressure continues to increase, the additional force causes the second portion 134 to reach its limit position resulting in the wholly open position. When pressure at the fuel tip is lessened or ended, the biasing member may push or move the second portion 134 toward the first portion 128 closing (partially and, then, wholly), the slots 131 through abutment of the angled surfaces 140 and 131.

Control of the assembly 126 may be passive or may be active, or may be a combination thereof. Passive actuation of the assembly 126 may include actuation based on the operation of the system, such as, for example, actuation based on increasing and decreasing pressures, such as described herein. Active actuation of the assembly 126 may include actuation that requires operator or system level input, such as, for example, electrical operation of a motor, a screw motor, or a linear actuator. Although described with respect to the secondary fuel passage 120, the assembly 126 may be provided in the primary fuel passage 118, or may be provided in both the secondary fuel passage 120 and the primary fuel passage 118.

Accordingly, flow of the fuel through the secondary fuel passage 120 of the fuel nozzle 100 may be adjusted throughout operation of the engine. For example, in certain conditions, it may be desirable to have no fuel flow through the secondary fuel passage 120 and, thus, the assembly 126 is controlled or moved into the fully closed position of FIG. 3. In other conditions, it may be desirable to have some fuel flow (e.g., more than no fuel flow but less than the maximum fuel flow permitted through the secondary passage) and, thus, the assembly 126 is controlled or moved to an intermediate position, such as shown in the exemplary position of FIGS. 4A and 4B. In other conditions, it may be desired to have the maximum fuel flow allowed by the secondary fuel passage 120 and thus the assembly 126 may be controlled or moved into the fully open position of FIGS. 5A and 5B. The determination of the desired fuel flow through the secondary fuel passage 120 may be determined based on a current operating condition of the engine, a desired operation condition of the engine, or both.

Figure 6A:
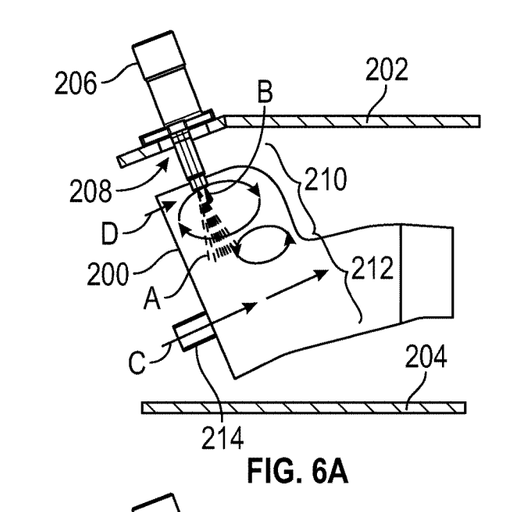
FIG. 6A shows a schematic of a combustor having a fuel nozzle, according to an embodiment of the present disclosure.
Figure 6B:
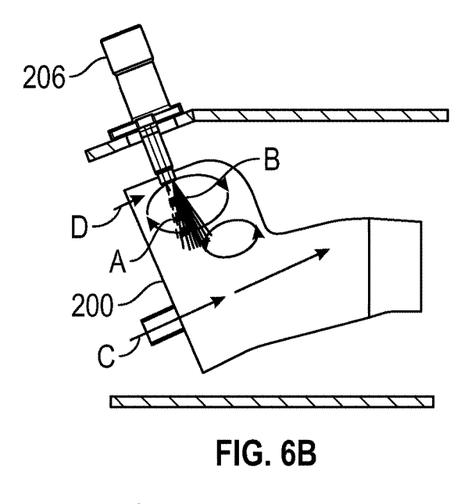
FIG. 6B shows a schematic of a combustor having a fuel nozzle, according to an embodiment of the present disclosure.

FIGS. 6A and 6B show a combustor 200 located within an outer case 202 and an inner case 204. Within the combustor 200 may be a primary zone 210 and a secondary zone 212. One or more fuel nozzles 206 may be placed in one or more openings 208 of the outer case 202. The fuel nozzles 206 may be the fuel nozzle 10 of FIGS. 1A and 1B. The fuel nozzles 206 may introduce fuel into an interior of the combustor 200. The fuel nozzle 206 may include concentric, coaxial primary and secondary fuel passages (not visible), and a flow divider valve located in the upper body, such as described with respect to FIG. 1. The primary fuel passage may introduce a primary fuel flow A to the interior of the combustor 200. The secondary fuel passage may introduce a secondary fuel flow B to the interior of the combustor 200. The primary fuel flow A and the secondary fuel flow B may interact with an air flow C from a chute 214 and an air flow D from a compressor (not visible).

In low power conditions, exemplified in FIG. 6A, the secondary fuel flow B may be a dribble or a trickle. That is, the secondary fuel flow B may be weak. No atomization of the secondary fuel flow B may occur at low power conditions employing a prior art fuel nozzle. In mid power conditions employing the prior art fuel nozzle, such as the example shown in FIG. 6B, a lower pressure drop may occur at the secondary fuel outlet. This may result in low spray penetration and low mixing with the air flows C and D. The flow divider valve may take significant pressure drops as a percentage of fuel nozzle total pressure drop and may be considered to be a parasitic loss resulting in nonuniform spray distribution at low and partial power conditions, higher pump pressures, and low pressure drops at the secondary fuel outlet. The fuel nozzle 306 may be a high turn down ratio fuel nozzle having large secondary flow numbers and, therefore, low pressure and/or low atomization over large portions of the operating range.

Figure 7A:
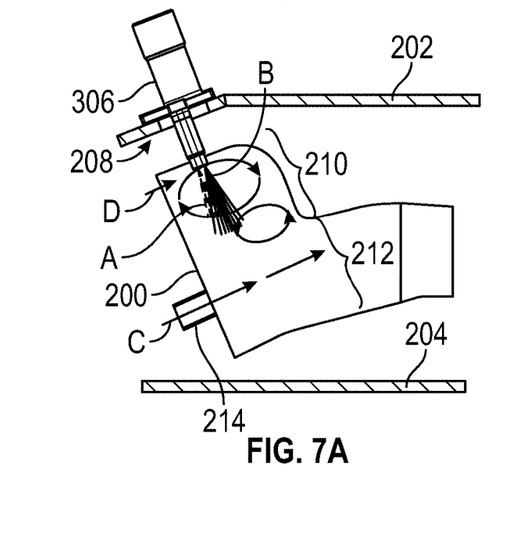
FIG. 7A shows a schematic of a combustor having a fuel nozzle, according to an embodiment of the present disclosure.
Figure 7B:
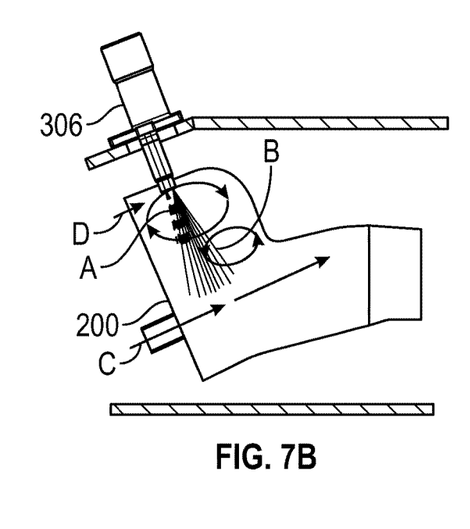
FIG. 7B shows a schematic of a combustor having a fuel nozzle, according to an embodiment of the present disclosure.

As shown in FIGS. 7A and 7B, the combustor 200 may include one or more fuel nozzles 306. The fuel nozzles 306 may be the fuel nozzle 100 of FIGS. 2, 3, 4A, 4B, 5A, and 5B. The fuel nozzles 306 may include primary fuel flow A and secondary fuel flow B, provided by the primary fuel passage 118 and the secondary fuel passage 120 of FIG. 3. The secondary fuel passage 120 may include an assembly for metering the flow of the secondary fuel flow B (e.g., assembly 126).

In FIG. 7A, at low power conditions, the fuel nozzle of the present disclosure may allow for atomization at very low flow rates through the secondary fuel passage. This may allow for improved and faster vaporization and mixing with the air flows C and D, as compared to the prior art fuel nozzles. In FIG. 7B, at mid power conditions, the fuel nozzle of the present disclosure may achieve increased atomization quality and spray penetration that may result in increased efficiency. These results may be achieved due to the ability to change, to meter or to vary the flow of fuel through the secondary fuel passage using the assembly (e.g., assembly 126) described herein, which allows for changing the flow through the secondary fuel passage at any time (e.g., in this case, changing it between low power and mid power conditions). Such independent control of the secondary fuel flow may allow for optimization of the emissions and efficiency of the engine.

Accordingly, the fuel nozzle of the present disclosure provides a variable tip fuel nozzle. The fuel nozzle may be a dual simplex orifice fuel nozzle having a primary spray and a secondary spray that are non-concentric. This may allow spacing of the fuel flow either circumferentially or axially. The fuel nozzle may include a variable area spin slot geometry for increased atomization and mixing. The secondary atomizing tip may provide the combined function of atomization and a flow-divider valve.

The fuel nozzle of the present disclosure may include primary and secondary spray tips that are not concentric (e.g., dual orifice atomizer). Separating the primary and secondary fuel flows to side-by-side flows allows the ability to place a traversing sleeve center-body in the secondary flow passage. The traversing sleeve center-body may include teeth that form one half of secondary spin slots located in the secondary flow passage. When closed, the secondary teeth of the sleeve rest against the secondary hub slots only allowing small leakage flow that may be sealed upstream, similar to a traditional check-valve. When fuel pressure is applied to the secondary flow outlet (e.g., tip of the secondary flow passage), the pressure may push the spring-loaded toothed sleeve away from the tip hub opening slots between the hub and the sleeve that permit flow to pass. As fuel pressure increases, additional force is applied to the spring, causing the slots to open more until the spring reaches a hard stop. In this manner, there is a sufficient pressure drop at every position of the sleeve and there is a relatively small slot area at the secondary tip to produce atomization of the fuel flow.

The fuel nozzle of the present disclosure allows for increased atomization at the fuel nozzle tip at low fuel flows, which may result in a higher low power efficiency and reduced smoke (due to elimination of excessive droplet sizes that reside at high temperature for a longer time). The fuel nozzle of the present disclosure may provide a pressure drop at the tip that may reduce the risk of fuel coupled dynamics. This may occur by attenuating combustor dynamics to lower amplitudes within the fuel nozzle stem. The fuel nozzle of the present disclosure may reduce overall fuel system pressure needs by eliminating extra pressure drop across the flow divider valve.

The fuel nozzle of the present disclosure may eliminate the need for the large flow divider valve in the housing (e.g. upper body 16). The fuel nozzle of the present disclosure may thus result in a smaller housing (e.g., smaller upper body 116 as compared to upper body 16, since the flow divider valve is no longer housed within upper body 116). This may result in less second stream blockage. The fuel nozzle of the present disclosure may allow for combining the tip (e.g., tip 114 and secondary fuel outlet 124) and flow divider valve (e.g., assembly 126). This may allow for lower differential pressure across the fuel nozzle, which may result in smaller pump sizes and/or greater turn-down ratios as compared to the prior art fuel nozzles (e.g., fuel nozzle 10).

Further aspects of the present disclosure are provided by the subject matter of the following clauses.

1. A fuel nozzle for a combustor, the fuel nozzle comprising: a primary fuel passage having a primary fuel outlet; a secondary fuel passage having a secondary fuel outlet; and a valve located within the secondary fuel passage, the valve comprising: a stationary hub having a plurality of first angled surfaces; and a movable sleeve having a plurality of second angled surfaces, wherein each of the plurality of first angled surfaces aligns axially with a respective one of the plurality of second angled surfaces to define a slot therebetween, and wherein the valve is movable among a plurality of positions to open, to close, or to partially open the slots.

2. The fuel nozzle of any preceding clause, wherein the primary fuel passage and the secondary fuel passage are non-concentric.

3. The fuel nozzle of any preceding clause, wherein the slots have a variable size defined by the distance between respective first angled surfaces and second angled surfaces.

4. The fuel nozzle of any preceding clause, wherein the slots have a first size when the valve is in an open position, a second size when the valve is in a closed position, and a third size when the valve is in a partially open position.

5. The fuel nozzle of any preceding clause, wherein the first size is larger than the second size and the second size is smaller than the third size.

6. The fuel nozzle of any preceding clause, wherein a greater fuel flow is permitted through the secondary fuel passage when the slots have the first size than when the slots have the third size or the second size.

7. The fuel nozzle of any preceding clause, wherein the movable sleeve comprises a plurality of teeth extending axially downward from the movable sleeve, the plurality of teeth each defining a distal end, and wherein the plurality of second angled surfaces are located at the distal ends.

8. The fuel nozzle of any preceding clause, wherein the plurality of first angled surfaces is located on a plurality of protruding members on a side surface of the stationary hub.

9. The fuel nozzle of any preceding clause, wherein a pressure of a fuel flow within the secondary fuel passage is configured to move the valve among the plurality of positions.

10. The fuel nozzle of any preceding clause, wherein the valve is passively or actively actuated to move among the plurality of positions.

11. The fuel nozzle of any preceding clause, further comprising a biasing member configured to bias the movable sleeve such that the valve is biased to a closed position.

12. A fuel nozzle for a combustor, the fuel nozzle comprising: a primary fuel passage having a primary fuel outlet; a secondary fuel passage having a secondary fuel outlet; and a valve located within the secondary fuel passage, the valve being movable among a plurality of positions including: (i) a first position where a stationary first portion and a movable second portion abut; (ii) a second position where the stationary first portion is spaced a first distance from the movable second portion; and (iii) a third position where the stationary first portion is spaced a second distance from the movable second portion, wherein the second distance is greater than the first distance, wherein the valve is configured to operate in a plurality of positions to meter flow through the secondary fuel passage and through the secondary fuel outlet and into an interior of the combustor, based on the position of the stationary first portion and the movable second portion.

13. The fuel nozzle of any preceding clause, wherein the primary fuel passage and the secondary fuel passage are non-concentric.

14. The fuel nozzle of any preceding clause, wherein the valve comprises a plurality of slots, each of the plurality of slots having a variable size.

15. The fuel nozzle of any preceding clause, wherein the slots have a first size when the valve is in an open position, a second size when the valve is in a closed position, and a third size when the valve is in a partially open position.

16. The fuel nozzle of any preceding clause, wherein the first size is larger than the second size and the second size is smaller than the third size.

17. The fuel nozzle of any preceding clause, wherein a greater fuel flow is permitted through the secondary fuel passage when the slots have the first size than when the slots have the third size or the second size.

18. The fuel nozzle of any preceding clause, wherein the stationary first portion is a hub and the movable second portion is a sleeve.

19. The fuel nozzle of any preceding clause, wherein a pressure of a fuel flow within the secondary fuel passage is configured to move the valve among the plurality of positions.

20. The fuel nozzle of any preceding clause, wherein the valve is passively or actively actuated to move among the plurality of positions.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A fuel nozzle for a combustor, the fuel nozzle comprising:
   a primary fuel passage having a primary fuel outlet;
   a secondary fuel passage having a secondary fuel outlet; and
   a valve located within the secondary fuel passage, the valve comprising:
   (a) a stationary hub having a plurality of first angled surfaces; and
   (b) a movable sleeve having a plurality of second angled surfaces; and
   (c) a plurality of slots defined between the plurality of first angled surfaces and the plurality of second angled surfaces, the plurality of slots configured to impart a swirl on a fuel flow through the secondary fuel passage, wherein the valve is movable among a plurality of positions to open, to close, or to partially open the plurality of slots.

2. The fuel nozzle of claim 1, wherein the primary fuel passage and the secondary fuel passage are non-concentric.

3. The fuel nozzle of claim 1, wherein the plurality of slots have a variable size defined by a distance between corresponding surfaces of the first angled surfaces and the second angled surfaces.

4. The fuel nozzle of claim 1, wherein the plurality of slots have a first size when the valve is in an open position, a second size when the valve is in a closed position, and a third size when the valve is in a partially open position.

5. The fuel nozzle of claim 4, wherein the first size is larger than the second size and the second size is smaller than the third size.

6. The fuel nozzle of claim 4, wherein a greater fuel flow is permitted through the secondary fuel passage when the plurality of slots have the first size than when the plurality of slots have the third size or the second size.

7. The fuel nozzle of claim 1, wherein the movable sleeve comprises a plurality of teeth extending axially downward from the movable sleeve, the plurality of teeth each defining a distal end, and wherein the plurality of second angled surfaces are located at the distal end.

8. The fuel nozzle of claim 1, wherein the plurality of first angled surfaces is located on a plurality of protruding members on a side surface of the stationary hub.

9. The fuel nozzle of claim 1, wherein a pressure of the fuel flow within the secondary fuel passage is configured to move the valve among the plurality of positions.

10. The fuel nozzle of claim 1, wherein the valve is passively or actively actuated to move among the plurality of positions.

11. The fuel nozzle of claim 1, further comprising a biasing member configured to bias the movable sleeve such that the valve is biased to a closed position.

12. A fuel nozzle for a combustor, the fuel nozzle comprising:
   a primary fuel passage having a primary fuel outlet;
   a secondary fuel passage having a secondary fuel outlet; and
   a valve located within the secondary fuel passage, the valve being movable among a plurality of positions including:
   (i) a first position where a stationary first portion and a movable second portion abut;

(ii) a second position where the stationary first portion is spaced a first distance from the movable second portion; and
(iii) a third position where the stationary first portion is spaced a second distance from the movable second portion, wherein the second distance is greater than the first distance; and
a plurality of slots defined between angled surfaces of the stationary first portion and angled surfaces of the movable second portion, the plurality of slots configured to impart a swirl on a fuel flow through the secondary fuel passage,
wherein the valve is configured to operate in the plurality of positions to meter flow through the secondary fuel passage and through the secondary fuel outlet and into an interior of the combustor, based on the position of the stationary first portion and the movable second portion.

13. The fuel nozzle of claim 12, wherein the primary fuel passage and the secondary fuel passage are non-concentric.

14. The fuel nozzle of claim 12, wherein each of the plurality of slots having a variable size.

15. The fuel nozzle of claim 12, wherein the third position is an open position, the first position is a closed position, and the second position is a partially open position.

16. The fuel nozzle of claim 12, wherein the plurality of slots are closed in the first position and the plurality of slots are open in the second position and the third position.

17. The fuel nozzle of claim 12, wherein a greater fuel flow is permitted through the secondary fuel passage when the plurality of slots have the first size second distance than when the plurality of slots have the first distance.

18. The fuel nozzle of claim 12, wherein the stationary first portion is a hub and the movable second portion is a sleeve.

19. The fuel nozzle of claim 12, wherein a pressure of the fuel flow within the secondary fuel passage is configured to move the valve among the plurality of positions.

20. The fuel nozzle of claim 12, wherein the valve is passively or actively actuated to move among the plurality of positions.

* * * * *